United States Patent
Albani et al.

[11] Patent Number: 5,820,171
[45] Date of Patent: Oct. 13, 1998

[54] OPTION CARD SLOT FILLER PLATE

[75] Inventors: David Joseph Albani, Holden; Robert John McCaffrey, Dracut; David Wilfred Tardiff, Tyngsborough, all of Mass.; Yun-Long Tun, Tu-Cheng, Taiwan; Alan Michael Vale, Marblehead, Mass.

[73] Assignee: Digital Equipment Corporation, Maynard, Mass.

[21] Appl. No.: 671,215

[22] Filed: Jun. 27, 1996

[51] Int. Cl.⁶ ....................................................... E05C 9/00
[52] U.S. Cl. ............................ 292/17; 292/251; 439/135; 361/683
[58] Field of Search .................................. 292/10, 17, 19, 292/20, 81, 251, DIG. 45; 439/135; 364/708.1; 361/816, 683

[56] References Cited

U.S. PATENT DOCUMENTS

| 854,045 | 5/1907 | Paugh | 292/251 X |
|---|---|---|---|
| 2,851,325 | 9/1958 | Moor | 292/19 X |
| 5,011,418 | 4/1991 | Perzentka, Jr. | 439/135 |
| 5,076,619 | 12/1991 | Chi | 439/135 X |
| 5,114,036 | 5/1992 | Liu | 361/683 X |
| 5,228,873 | 7/1993 | Hirai | 439/607 |
| 5,406,809 | 4/1995 | Igelmund | 439/135 X |
| 5,575,546 | 11/1996 | Radloff | 439/135 X |
| 5,579,210 | 11/1996 | Ruhland et al. | 361/816 |

FOREIGN PATENT DOCUMENTS

| 925484 | 3/1947 | France | 292/17 |

OTHER PUBLICATIONS

"COMPAQ Beyond Setup," p. 8–8, Apr., 1995.
IBM Technical Disclosure Bulletin vol. 19, No. 11 J. Greenfield/Adjustable Concealed Latch for Separable Machine Covers, Apr. 1977.

*Primary Examiner*—Rodney M. Lindsey
*Attorney, Agent, or Firm*—Krishnendu Gupta

[57] ABSTRACT

A filler plate for filling an option card slot in a computer enclosure includes a cover plate portion for substantially covering the option card slot. The cover plate portion has a first end and a second end opposite to the first end. A tongue extends from the first end of the cover plate portion for insertion into a capture slot located in the enclosure adjacent to the option card slot to secure the first end of the cover plate portion to the enclosure. First and second retaining tabs extend substantially perpendicularly from the cover plate for engaging first and second edges of the option card slot to hold the filler plate in position relative to the option card slot.

13 Claims, 3 Drawing Sheets

OPTION CARD SLOT FILLER PLATE

BACKGROUND

The enclosures for the average personal computer is commonly designed to include space for adding option cards (for example, sound or graphics cards) in order to increase the capabilities of the computer over those already provided by the motherboard. Inside the computer enclosure, the motherboard interfaces with a riser card which has a series of option card interfaces for interfacing with and horizontally orienting the option cards above the motherboard in a stack. Access to the option cards is provided by a series of option card slots located in an exterior wall of the enclosure. If a particular option card interface is unoccupied by an option card, an option card slot filler plate can be employed to cover the corresponding option card slot. Typically, current option card slot filler plates are held in place relative to the enclosure wall with a screw.

SUMMARY OF THE INVENTION

The draw back of such option slot filler plates is that two hands must be used to install them making their installation somewhat unwieldy.

The present invention provides a self retaining option card slot filler plate that can be installed with only one hand making installation easier and quicker than with current filler plates. The present invention option slot filler plate includes a cover plate portion for substantially covering an option card slot. The cover plate portion has a first end and a second end opposite to the first end. A tongue extends from the first end of the cover plate portion for insertion into a capture slot located in the enclosure adjacent to the option slot to secure the first end of the cover plate portion to the enclosure. First and second retaining tabs extend substantially perpendicularly from the cover plate portion for engaging first and second edges of the option card slot to hold the filler plate in position.

In preferred embodiments, the first and second retaining tabs are located proximate to the second end of the cover plate portion and resiliently engage the first and second edges of the option card slot to lock the filler plate into position. The first and second retaining tabs are bent inwardly from opposite edges of the cover plate portion and are curved outwardly away from each other before curving inwardly toward each other. The tongue extends at about a 5° angle from the cover plate portion to spring load the filler plate when the filler plate is held in position. The filler plate also includes a securing member extending perpendicularly from the second end of the cover plate portion for further securing the second end of the cover plate portion to the enclosure. The securing member has a fastening slot which allows the securing member to be fastened to the enclosure with a screw.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
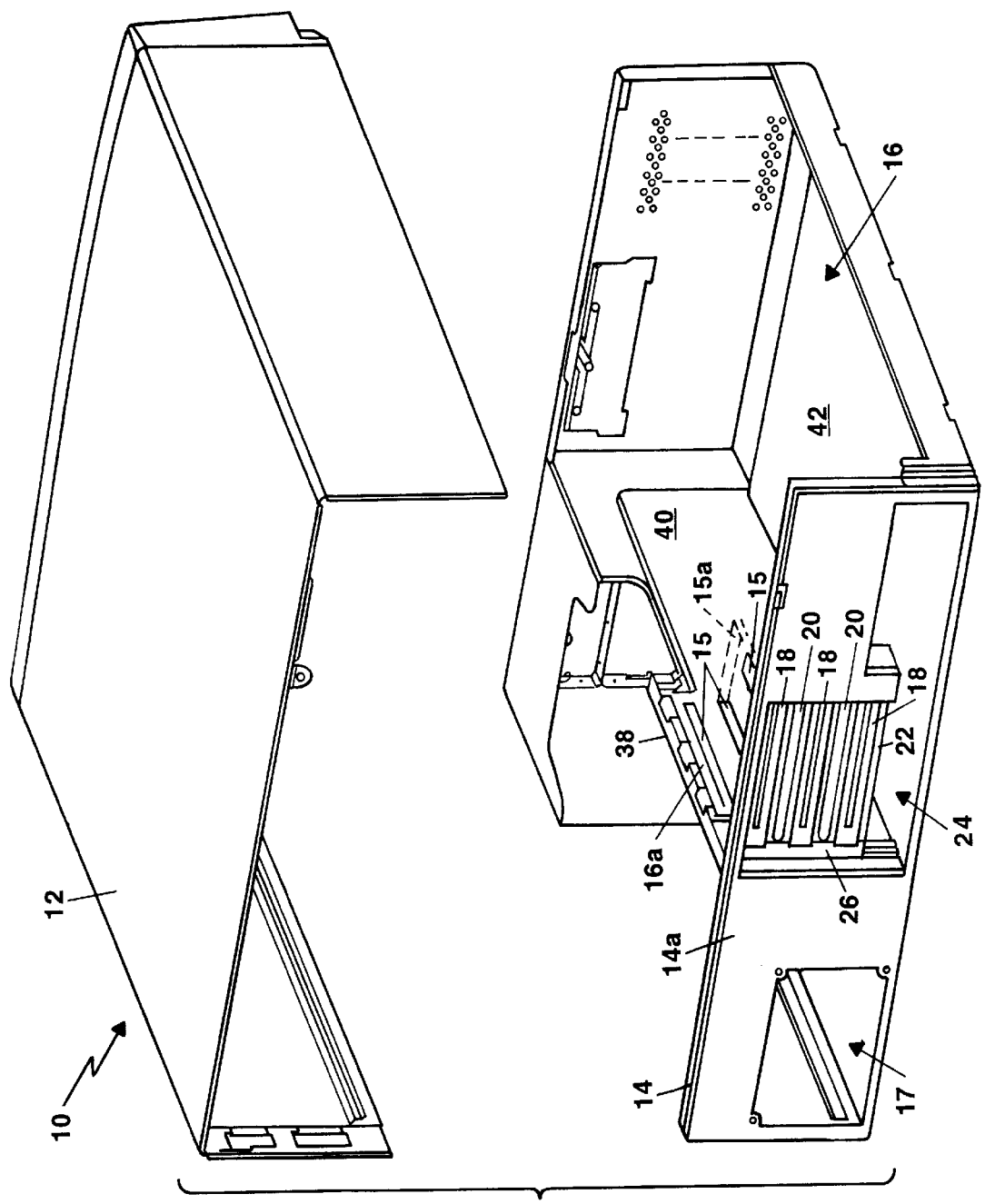
FIG. 1 is a perspective view of a personal computer enclosure employing the present invention option card slot filler plates for covering the option card slots.

FIG. 1 depicts an enclosure 10 for a personal computer including a top cover 12 and a base 14. A series of present invention option card slot filler plates 18 are positioned over respective option card slots 21 (FIG. 2) along wall 14a of base 14. The option card slots 21 provide access to interface connectors on option cards such as sound, graphics, modem, CD-ROM interface, I/O and disk drive controller cards which can be added to increase the capabilities of the computer. When option cards are not installed, the present invention filler plates 18 are employed to cover the option card slots 21.

When employed, option cards interface with a series of horizontal connectors 15 which are vertically disposed above each other on a riser card 40. An option card 15a is shown in phantom to illustrate the relation between the option cards and the option card slots 21. Riser card 40 is mounted to an internal partition wall 38 which separates base 14 into a region 16 and a region 17. The main circuit board or motherboard 42 of the computer is housed within region 16 and interfaces with riser card 40. The connectors 15 can be ISA bus connectors, PCI bus connectors, VESA bus connectors, or combinations thereof.

Figure 2:
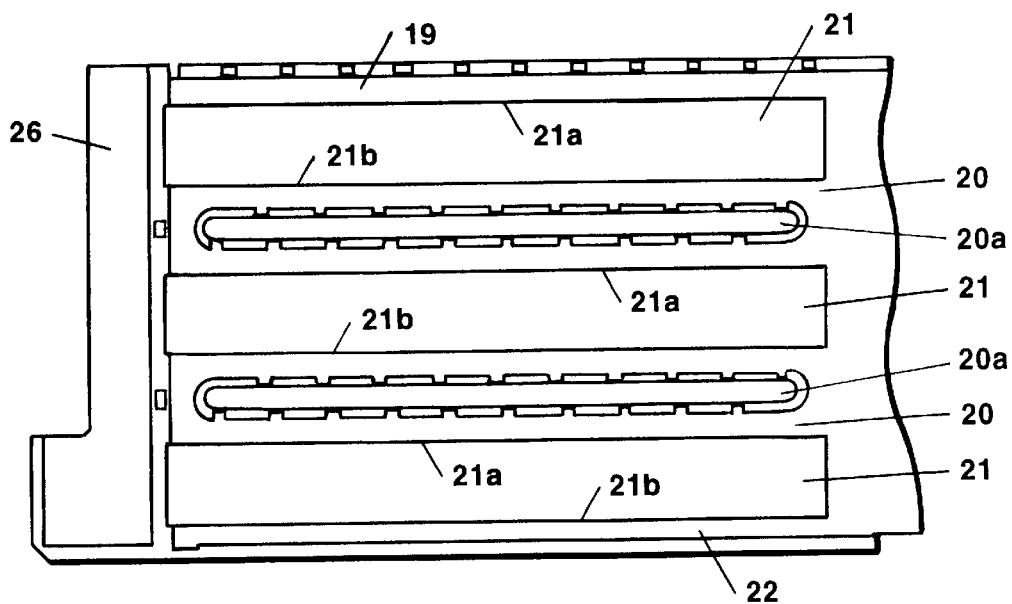
FIG. 2 is a rear view of the option card slots.

Referring to FIG. 2, the option card slots 21 are preferably formed in an option card slot plate 26 which is mounted to an opening 24 in wall 14a. Option card slot plate 26 functions as part of wall 14a. Option card slot plate 26 includes upper and lower ledges 19 and 22 as well as intermediate rails 20 for providing three option card slots 21 therebetween which are disposed vertically above each other. The intermediate rails 20 each include a rib 20a for strength and rigidity. Each option card slot 21 corresponds with a respective connector 15 and has opposing edges 21a and 21b.

Figure 3:
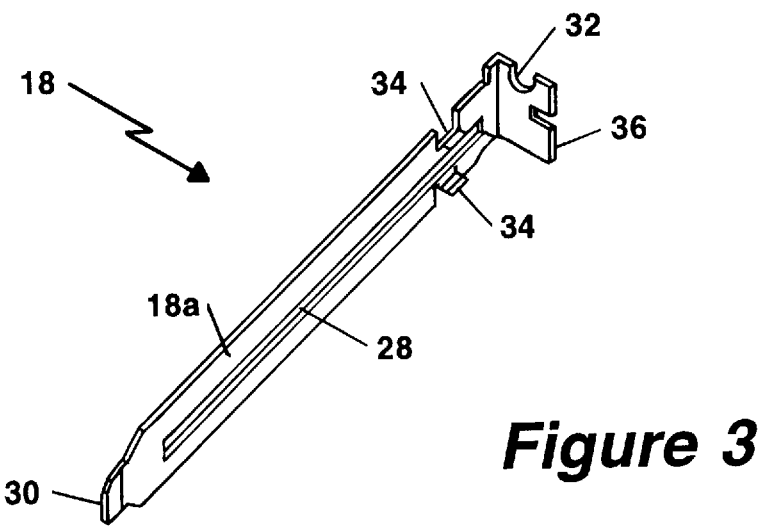
FIG. 3 is a perspective view of an option card slot filler plate.
Figure 4:
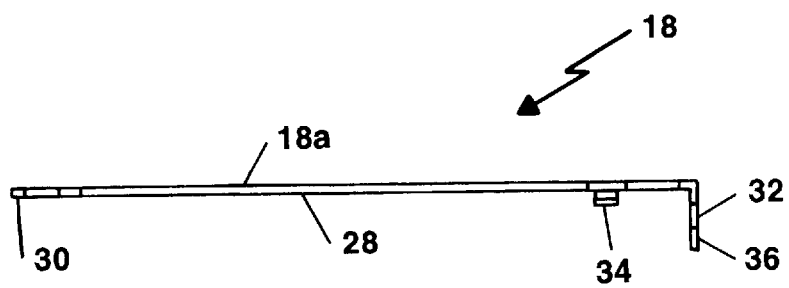
FIG. 4 is a top view of the option card slot filler plate.
Figure 5:
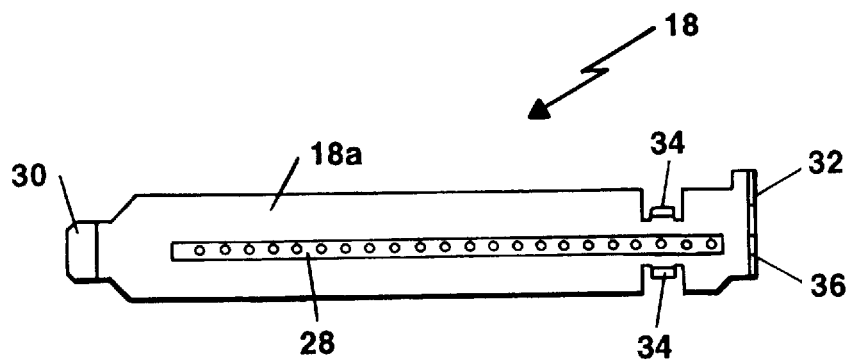
FIG. 5 is a rear view of the option card slot filler plate.

Referring to FIGS. 3, 4 and 5, option card slot filler plate 18 is preferably formed from a single piece of sheet metal and includes a planar elongate cover plate portion 18a which substantially covers an option card slot 21. Cover plate portion 18a includes a rib 28 formed therein which extends longitudinally along cover plate portion 18a to provide strength and rigidity to filler plate 18. A tongue 30 extends from one end of the cover plate portion 18a for insertion into a capture slot 40 formed within option slot plate 26 (FIG. 6) adjacent to one end of the option card slot 21. Tongue 30 extends at about a 5° angle from the plane of the cover plate portion 18a. The 5° angle of tongue 30 spring loads filler plate 18 when installed which prevents the filler plate 18 from vibrating when the computer is operating. The 5° angle of tongue also keeps tongue 30 more securely in place within capture slot 40. Although the 5° angle of tongue 30 is preferred, alternatively, the angle of tongue 30 can be varied or even omitted.

Two resilient retaining tabs 34 extend substantially perpendicularly from cover plate portion 18a at the end opposite to tongue 30 and on the same side that tongue 30 extends at the 5° angle. The retaining tabs 34 are bent inwardly from opposite edges of cover plate portion 18a. This locates the retaining tabs 34 on opposite sides of rib 28. The outer edges of the retaining tabs 34 are spaced apart at a distance slightly greater then the width of option slot 21. This distance is preferably about 0.489 inches but alternatively can be varied to provide different retaining characteristics or to accommodate option slots having different dimensions. The retaining tabs 34 curve outwardly away from each other and then curve inwardly. This allows the retaining tabs 34 be forcibly engaged with the edges 21a and 21b of option card slot 21 to lock filler plate 18 in place. Retaining tabs 34 also position filler plate 18 in the correct position relative to option card slot 21.

Figure 6:
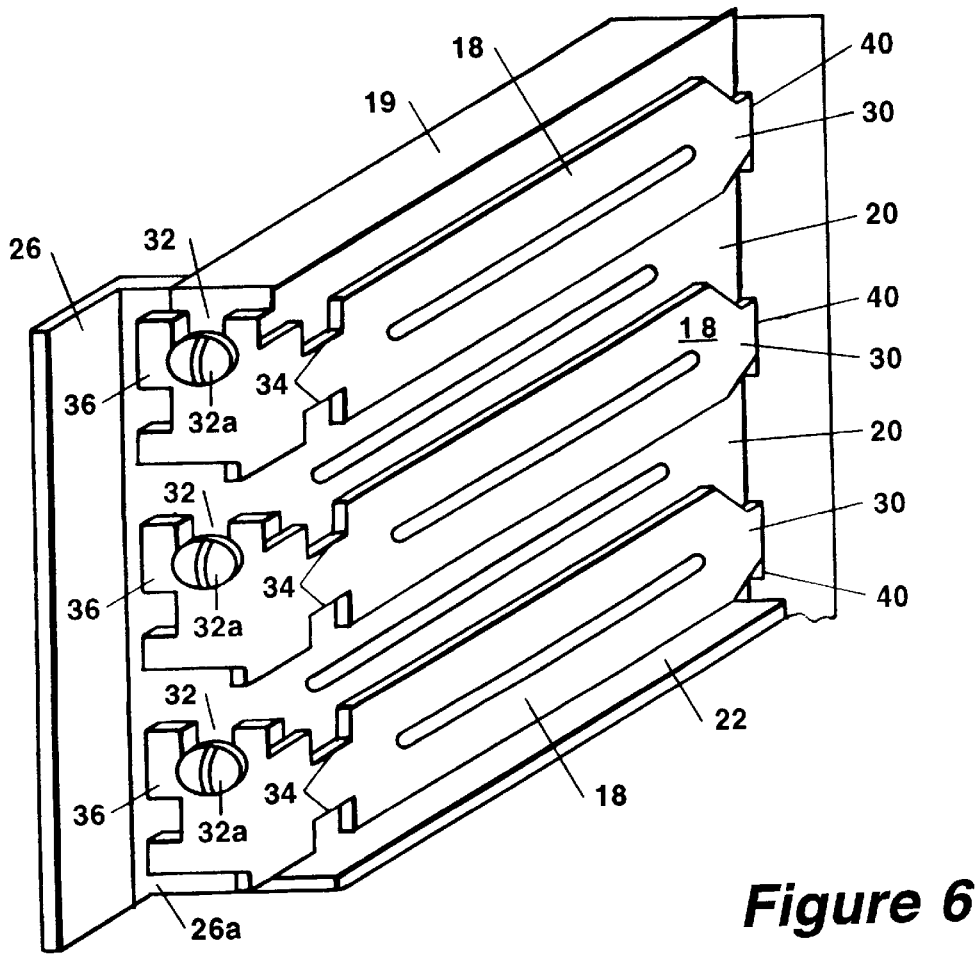
FIG. 6 is a rear perspective view of the option card slot filler plates covering the option card slots.

A securing member 36 extends perpendicularly from cover plate portion 18a on the end opposite from tongue 30 for further securing filler plate 18 to option card slot plate 26. Securing member 36 is capable of being secured to the edge 26a of option card slot plate 26 which is perpendicular to the plane of the option card slots 21 (FIG. 6). The upper portion of securing member 36 includes a slot 32 which allows securing member 36 to be fastened to edge 26a by a screw 32a. Slot 32 has an open end which facilitates installation and allows for adjustment. Although securing member 36 is preferably perpendicular to cover plate portion 18a, alternatively, securing member 36 can lie along the same plane as cover plate portion 18a. In such a case, option card slot plate 26 would be modified to accommodate the design change.

Filler plate 18 is preferably stamped from a single piece of sheet metal and is about 0.034 inches thick, 0.725 inches high and 4.725 inches long for covering an option card slot 21 of about 4 inches long by about 0.48 inches high. Alternatively, the dimensions of filler plate 18 can be varied to provide different mechanical characteristics or to accommodate option card slots having different dimensions. Additionally, filler plate 18 can be formed from a block of metal or molded from a piece of plastic.

Referring to FIG. 6, in operation, each filler plate 18 is installed over an option card slot 21 by first inserting tongue 30 into a retaining slot 40 located on the edge of option card slot plate 26. Filler plate 18 is then pivoted towards the option card slot 21 to engage the resilient retaining tabs 34 of filler plate 18 with the opposing edges 21a and 21b of option card slot 21 (FIG. 2). Retaining tabs 34 deflect inwardly towards each other when first engaging the edges 21a and 21b of option card slot 21 and then spring back outwardly after the outer curve of the retaining tabs 34 have passed through the option card slot 21 to lock filler plate 18 in place. The retaining tabs 34 allow the filler plate 18 to be self-retaining. The 5° angle of tongue 30 causes filler plate 18 to be spring-loaded against option card slot plate 26. This provides a tighter fit and reduces vibration when the computer is operating. A screw 32a then secures securing member 36 to the edge 26a of option card slot plate 26 to further secure filler plate 18 to the option card slot plate 26.

Equivalents

While this invention has been particularly shown and described with references to preferred embodiments thereof, it will be understood by those skilled in the art that various changes in form and details may be made therein without departing from the spirit and scope of the invention as defined by the appended claims. For example, securing member 36 can be omitted such that only retaining tabs 34 lock filler plate 18 in place. Additionally, option card slot plate 26 can be omitted in which case option card slots 21 are instead formed in wall 14a. Although three option card slots 21 are depicted in the drawings, the present invention filler plate is not limited to covering only three option card slots. Finally, although filler plate 18 is depicted in the drawings for use on a desktop computer enclosure, alternatively, filler plates 18 can be employed on enclosures for towers.

What is claimed:

1. A filler plate for an option card slot in an enclosure of a computer comprising:

a cover plate portion for substantially covering the option card slot, the cover plate portion having a first end and a second end opposite the first end;

a tongue extending from the first end of the cover plate portion for insertion into a capture slot located in the enclosure adjacent to the option card slot to secure the first end of the cover plate portion to the enclosure;

first and second retaining tabs extending substantially perpendicularly from the cover plate portion for engaging first and second edges of the option card slot to hold the filler plate in position relative to the option card slots; and a securing member extending from the second end of the cover plate portion, the securing member having a fastening slot for fastening the securing member to the enclosure with a screw for further securing the second end of the cover plate portion to the enclosure, said first and second retaining tabs retaining the filler plate in position in a manner that enables reduced handling when installing the filler plate including securing with the screw.

2. The filler plate of claim 1 in which the first and second retaining tabs are located proximate to the second end of the cover plate portion.

3. The filler plate of claim 1 in which the first and second retaining tabs are adapted to resiliently engage the first and second edges of the option slot to lock the filler plate into position.

4. The filler plate of claim 1 in which the first and second retaining tabs are bent from opposite edges of the cover plate portion.

5. The filler plate of claim 4 in which the first and second tabs curve outwardly away from each other and then curve inwardly toward each other.

6. The filler plate of claim 1 in which the tongue extends at about a 5° angle from the cover plate portion to spring load the filler plate when the filler plate is held in position.

7. The filler plate of claim 1 in which the securing member extends perpendicularly from the second end of the cover plate portion.

8. A filler plate for an option card slot in an enclosure of a computer comprising:

a cover plate portion for substantially covering the option card slot, the cover plate portion having a first end and a second end opposite the first end;

a tongue extending from the first end of the cover plate portion for insertion into a capture slot located in the enclosure adjacent to the option card slot to secure the first end of the cover plate portion to the enclosure;

first and second resilient retaining tabs extending substantially perpendicularly from the cover plate portion proximate to the second end of the cover plate portion for resiliently engaging first and second edges of the option card slot to lock the filler plate in position relative to the option card slot; and a securing member extending perpendicularly from the second end of the cover plate portion, the securing member having a fastening slot for fastening the securing member to the enclosure with a screw for further securing the second end of the cover plate portion to the enclosure, said first and second retaining tabs retaining the filler plate in position in a manner that enables reduced handling when installing the filler plate including securing with the screw.

9. The filler plate of claim 8 in which the first and second retaining tabs are bent from opposite edges of the cover plate portion.

10. The filler plate of claim 9 in which the first and second retaining tabs curve outwardly away from each other and then curve inwardly toward each other.

11. The filler plate of claim 8 in which the tongue extends at about a 5° angle from the cover plate portion to spring load the filler plate when the filler plate is held in position.

12. A method of filling an option card slot in an enclosure of a computer with a filler plate, the filler plate including a cover plate portion for substantially covering the option card slot, the method comprising the steps of:

securing a first end of the cover plate portion to the enclosure by inserting a tongue extending from the first end of the cover plate portion into a capture slot located adjacent to the option card slot;

positioning and holding the filler plate into proper position relative to the option card slot with first and second retaining tabs, the first and second retaining tabs extending substantially perpendicularly from the cover plate portion and engaging first and second edges of the option card slot; and securing a second end of the cover plate portion to the enclosure by fastening a securing member extending from the second end of the cover plate portion to the enclosure with a screw, said first and second retaining tabs retaining the filler plate in position in a manner that enables reduced handling when installing the filler plate including securing with the screw.

13. The method of claim 12 further comprising the step of extending the tongue at about a 5° angle from the cover plate portion such that the filler plate becomes spring loaded when second end of the cover plate portion is held in position.

* * * * *